US007938723B2

(12) United States Patent
Hein et al.

(10) Patent No.: US 7,938,723 B2
(45) Date of Patent: *May 10, 2011

(54) MULTIPLE PRIMARY GAMES FOR A GAMING DEVICE

(75) Inventors: Marvin A. Hein, Las Vegas, NV (US); Michael J. Mitchell, Las Vegas, NV (US); John R. Vallejo, Henderson, NV (US); David B. Schultz, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 271 days.

This patent is subject to a terminal disclaimer.

(21) Appl. No.: 11/537,471

(22) Filed: Sep. 29, 2006

(65) Prior Publication Data

US 2008/0004101 A1 Jan. 3, 2008

Related U.S. Application Data

(63) Continuation-in-part of application No. 11/428,220, filed on Jun. 30, 2006, now Pat. No. 7,857,698.

(51) Int. Cl.
*G06F 17/00* (2006.01)
*G06F 19/00* (2006.01)
*A63F 13/00* (2006.01)

(52) U.S. Cl. ................. 463/29; 463/16; 463/20; 463/25

(58) Field of Classification Search .................... 463/30, 463/16, 20, 25, 29
See application file for complete search history.

(56) References Cited

U.S. PATENT DOCUMENTS

| | | | | |
|---|---|---|---|---|
| 4,856,787 | A | 8/1989 | Itkis | |
| 5,380,008 | A * | 1/1995 | Mathis et al. | 463/18 |
| 5,848,932 | A * | 12/1998 | Adams | 463/20 |
| 6,113,098 | A * | 9/2000 | Adams | 273/143 R |
| 6,162,121 | A | 12/2000 | Morro et al. | |
| 6,224,483 | B1 * | 5/2001 | Mayeroff | 463/20 |
| 6,598,877 | B1 * | 7/2003 | Luciano et al. | 273/142 R |
| 6,634,945 | B2 * | 10/2003 | Glavich et al. | 463/25 |
| 6,663,487 | B1 * | 12/2003 | Ladner | 463/13 |
| 6,663,488 | B1 * | 12/2003 | Adams | 463/17 |
| 6,793,577 | B1 * | 9/2004 | Wilkins et al. | 463/16 |
| 6,805,634 | B1 * | 10/2004 | Wells et al. | 463/42 |
| 6,860,810 | B2 * | 3/2005 | Cannon et al. | 463/20 |
| 6,923,441 | B2 * | 8/2005 | Inoue | 273/143 R |
| 6,652,378 | B2 | 11/2005 | Cannon et al. | |
| 7,144,321 | B2 * | 12/2006 | Mayeroff | 463/16 |
| 2002/0183105 | A1 * | 12/2002 | Cannon et al. | 463/16 |
| 2003/0036422 | A1 * | 2/2003 | Baerlocher et al. | 463/20 |
| 2003/0045343 | A1 * | 3/2003 | Luccesi et al. | 463/20 |

(Continued)

FOREIGN PATENT DOCUMENTS

DE 19613455 8/1997

(Continued)

*Primary Examiner* — Milap Shah
(74) *Attorney, Agent, or Firm* — Steptoe & Johnson LLP

(57) ABSTRACT

A system and method for providing multiple, primary games in a gaming device are disclosed. In one embodiment a gaming machine comprises a memory means for storing two or more primary games. A central processing unit is operatively connected to a player input mechanism, wherein the central processing unit receives a trigger to select one of the primary games for game play. A primary game selection means selects one of the primary games from the memory means, and the selected primary game is displayed on a game display.

21 Claims, 8 Drawing Sheets

U.S. PATENT DOCUMENTS

2003/0050108 A1* 3/2003 Gauselmann .................. 463/16
2003/0064771 A1* 4/2003 Morrow et al. ................ 463/16
2003/0064784 A1* 4/2003 Wells et al. .................... 463/20
2003/0092476 A1* 5/2003 Fox ................................ 463/13
2003/0104853 A1* 6/2003 Tessmer et al. ................ 463/16
2003/0153379 A1* 8/2003 Beaulieu ........................ 463/16
2003/0195029 A1 10/2003 Frohm et al.
2003/0212636 A1* 11/2003 Resnick ......................... 705/42
2004/0048645 A1* 3/2004 Webb et al. .................... 463/16
2005/0075159 A1 4/2005 Kaminkow
2005/0124405 A1 6/2005 Nordman
2006/0089190 A1* 4/2006 Bryant et al. .................. 463/20
2007/0167208 A1* 7/2007 Acres ............................. 463/16

FOREIGN PATENT DOCUMENTS

| | | | |
|---|---|---|---|
| EP | 1082979 | | 3/2001 |
| EP | 1 253 563 | A2 | 10/2002 |
| EP | 1260928 | | 11/2002 |
| GB | 2393020 | | 3/2004 |
| WO | 2004022181 | | 3/2004 |

* cited by examiner

MULTIPLE PRIMARY GAMES FOR A GAMING DEVICE

CROSS-REFERENCE TO RELATED APPLICATIONS

This application is continuation-in-part of U.S. patent application Ser. No. 11/428,220, filed Jun. 30, 2006, now U.S. Pat. No. 7,857,698, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Various types of gaming machines have been developed with different features to captivate and maintain player interest. For example, gaming machines may include flashing displays, lighted displays, or sound effects to capture a player's interest in a gaming device.

Another important feature of maintaining player interest in a gaming machine includes providing the player with many opportunities to win awards, such as cash rewards or prizes. For example, in some slot machines, the display windows show more than one adjacent symbol on each reel, thereby allowing for multiple-row betting. Other types of slot machines have been developed that offer second-chance or bonus games that provide players with additional opportunities to win, such as with a bonus wheel. Furthermore, some gaming machines offer a player the opportunity to win millions of dollars by providing progressive jackpots. Additionally, other gaming machines include mystery-style bonus games that are used to entice and enhance player excitement.

While gaming machines including mystery-style and other bonus games have been very successful, there remains a need for gaming machines that provide a player with enhanced excitement and increased opportunity of winning.

BRIEF SUMMARY

Briefly, and in general terms, various embodiments are directed to a system and method for providing multiple selectable primary games in a gaming device. One embodiment is directed to a gaming machine comprising a memory means for storing at least a first primary game and a second primary game. A central processing unit is operatively connected to a player input mechanism, wherein the central processing unit receives a trigger to select one of the primary games for game play. A primary game selection means selects one of the primary games from the memory means, and the selected primary game is displayed on a game display Another embodiment is directed to a method for playing a game on a gaming machine having at least two distinct primary games. The method comprises receiving a player wager. After receiving the wager, a primary game is selected for game play. Lighting effects are activated to draw attention to the location of the selected game and the then the selected primary game is activated. The game outcome is presented to the player and a payout is awarded for the game outcome as appropriate.

DETAILED DESCRIPTION

Figure 1:
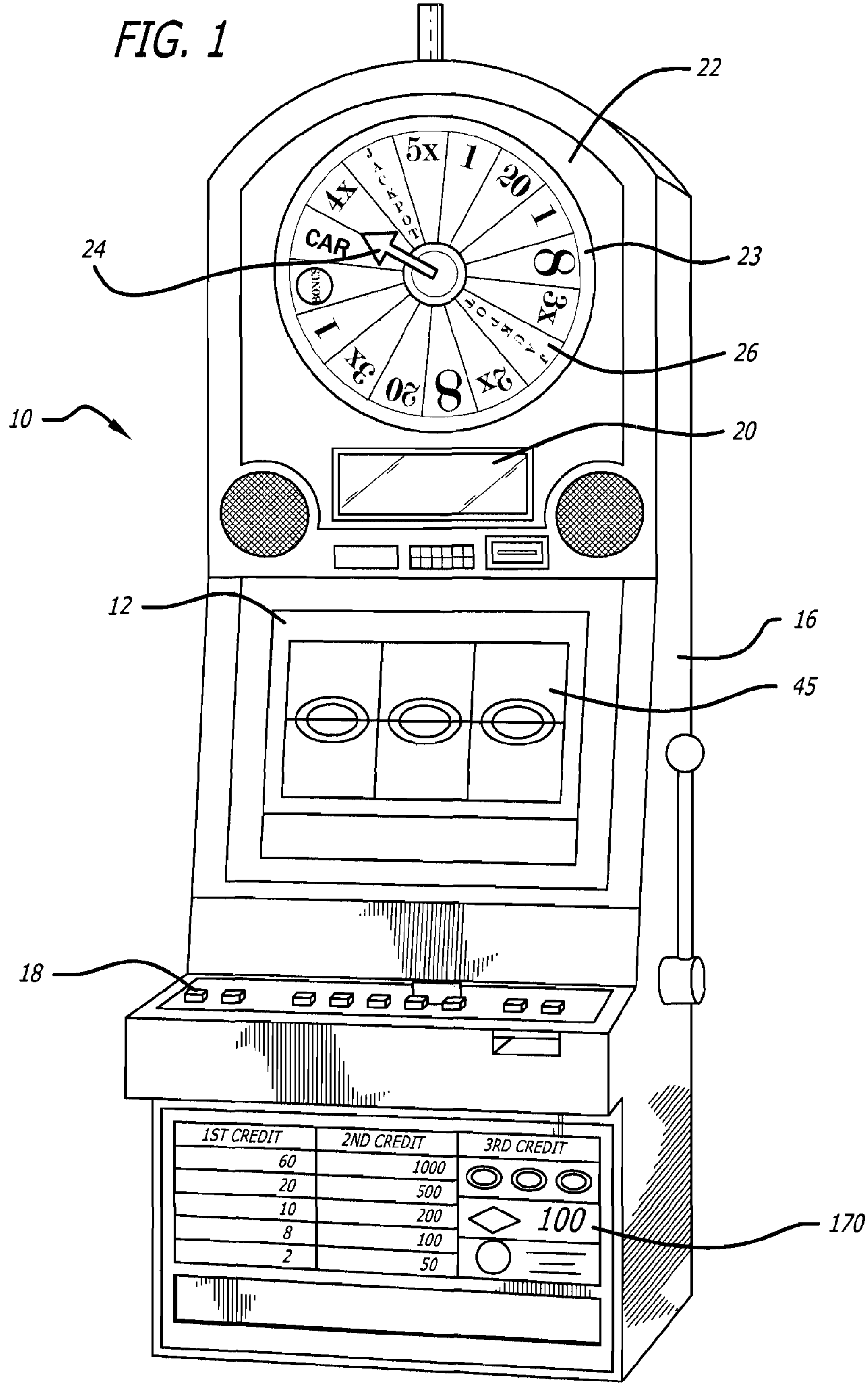
FIG. 1 illustrates an embodiment of a gaming machine comprising multiple primary games.

Various embodiments disclosed herein are directed to a system and method for providing multiple randomly selectable primary games in a gaming device. More particularly, the gaming devices offer multiple, distinct primary games, which are randomly selected and presented to a player upon the receipt of a player wager. Embodiments of the system, method and gaming device are illustrated and described herein by way of example only and not by way of limitation.

Referring now to the drawings, wherein like reference numerals denote like or corresponding parts throughout the drawings and, more particularly to FIGS. 1-9, there are shown various embodiments of systems and methods capable of providing multiple randomly selectable primary games in a gaming device.

Referring to FIG. 1, a gaming machine 10 having a first primary game display 12 and a second primary game display 22 is shown. The gaming machine 10 further includes a cabinet 16. The cabinet 16 is a self-standing unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 16 may be manufactured with reinforced steel or other rigid materials that are resistant to tampering and vandalism. Optionally, in an alternate embodiment, the gaming machine 10 may instead be a cinema-style gaming machine (not shown), as disclosed in U.S. application Ser. No. 11/225,827, entitled "Ergonomic Gaming Cabinet," filed on Sep. 12, 2005, which is hereby incorporated by reference.

In one embodiment, the cabinet 16 shown in FIG. 1 houses a game management unit (not shown) that includes a processor, circuitry, and software for receiving signals from the player-activated buttons 18 and a handle 19, operating the games, and transmitting signals to the respective displays and speakers 21.

The first primary game display 12 and the second primary game display 22 present one or more games of chance such as, but not limited to, mechanical slots, video slots, video poker, video blackjack, video keno, roulette, Class II bingo, craps, a mechanical wheel game or video representation of a wheel game. In alternate embodiments, it may further be appreciated that games of skill or games of chance involving some player skill may be presented in the first primary game display 12.

In one embodiment the second primary game display 22 presents a game of chance different from the game presented in the first primary game display 12. In an alternative embodiment, the second primary game display 22 presents the same game as the one displayed in the first primary game display 12.

Optionally, in one embodiment, the first primary game display 12 is a video display such as, but not limited to, CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions. Optionally in an alternate embodiment, the second primary game display 22 is also a video display. In other embodiments, only one of the game displays 12 and 22 is a video display. Additionally, in another embodiment, at least one of the first primary game display 12 and the second primary game display 22 may also include a conventional touch-screen or touch-glass system (not shown).

Additionally, more than one game may be shown or played simultaneously, substantially simultaneously or sequentially, on one of the game displays 12, 22, such as four hands of blackjack. In one embodiment, second primary game display 22 presents a game of chance different from the game presented in or on first primary game display 12. In an alternative embodiment, second primary game display 22 presents the same game as the one displayed in first primary game display 12. In another embodiment, game displays 12, 22 are linked together for simultaneous or coordinated play of one or more games.

Referring again to FIG. 1, the gaming machine 10 includes a plurality of player-activated buttons 18. These buttons 18 may be used for various functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may be "pulled" by a player to initiate a game.

In optional embodiments, the buttons 18 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference.

Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of pay lines to play in a game and the number of credits to bet per line.

Alternately, in an optional embodiment, the gaming machine 10 includes a video display 20 for presenting information such as, but not limited to, game related information, player information, advertisements and casino promotions, graphic displays, news and sports updates, or even offer another game. This information may be generated through a host computer networked with the gaming machine 10 on its own initiative or it may be obtained by request of the player using either one or more of the plurality of player-activated buttons 18, the video display itself if video display 20 comprises a touch screen or similar technology, buttons mounted about video display 20 (not shown) which may permit selections such as those found on an ATM machine where legends on the screen are associated with respective selecting buttons, or through use of the keypad shown beneath video display 20.

In one exemplary embodiment, the gaming machine 10 includes two distinct primary games, referred to as a first primary game and a second primary game which are operable together with first primary game display 12 and second primary game display 22, respectively. The first primary game is a reel game including one or more indicia-bearing reels and the second primary game is a wheel game. A game selector is connected to the gaming circuitry and selects the game that will be played when a player initiates a game by making a wager and pressing the 'play' button (which may be one of the buttons 18 or may be some other player interface device such as an input device connected to video display 20) or pulls handle 19. In one embodiment, the games are randomly selected. Optionally, in another embodiment, a random number generator (RNG) may be used to select one of the multiple primary games offered on a gaming machine. The weighting of the RNG may be selected to statistically select the first primary game more often than the second primary game. By example, the RNG may be weighted to statistically select the second primary game, once in every thirty plays of the gaming machine 10. In one embodiment, the selection of primary games is independent of the play or gaming result of the other primary game and strictly driven by an RNG or some similar operation. In another embodiment, the selection of one of the primary games may be driven by an event on gaming machine 10, such as a win of an additional play of a selected game. Additionally, it may be appreciated by example that a counter may be used in place of an RNG to select the second primary game. For instance, when a game is played on the gaming machine 10, the first ten plays will be of the first primary game and the eleventh play will be of the second primary game. This sequence may run continuously independent of the player such that a gaming machine counter automatically triggers the selection of the game played. Alternatively, the gaming machine counter can reset to zero or one each time a new player begins play.

Referring back to FIG. 1, a reel game is presented on the first primary game display 12 and includes three mechanical spinning reels 45. In alternate embodiments, those skilled in the art will appreciate that any number of spinning reels may be used. The mechanical reel game presented in the first primary game display 12 is a game of chance wherein a player receives one or more outcomes from a set of potential outcomes indicated by award schedule 70. Each reel is designed to rotate and then stop in order to display at least one, and preferably, a number of indicia. If the combination of indicia displayed by the reels is one of the predetermined plurality of winning indicia sets, then the player is provided with a winning payout either through a coin dispenser or by increasing the player's credits in a credit window.

As shown in FIG. 1, the second primary game display 22 presents a wheel game comprising a wheel 23 and pointer 24.

Wheel 23 is a fixed illustration of a wheel that includes payout indicators 26 on the face thereof. Various values are identified on the payout indictors, e.g., "1000", "250", "60", "125", etc. A pointer 24 is located in proximity to the wheel 23 so as to rotate about the illustration of the wheel 23. During play of the secondary game, the pointer 24 moves in a circular motion around the stationary wheel 23 and eventually comes to a stop in front of a payout indicator 26, thereby indicating a payout on the wheel 23 which the player has won. Alternatively, the pointer 24 is fixed and the wheel 23 spins.

Conventionally, payout indicator 26 is identified by gaming software operating on or in conjunction with gaming machine 10 through a random generator, such as a random number generator. The random generator assists in avoiding potential defective mechanical components that may drive an unlikely number of wins or losses. Prior to identifying payout indicator 26, the rate of speed of the spinning portion is adjusted to slow down to give an illusion of a free spinning device in order to build excitement and enjoyment of the player as the moment of selection builds.

In another embodiment, a second primary game display 22 comprises a wheel game having an illuminated physical pointer 24. Additionally, lights are placed about the axis of the wheel 23 (not shown). In this and other similar embodiments, the lights are selectively turned on and off until a selected payout indicator 26 is illuminated to identify the winning selection. The lights may be conventionally controlled by circuitry tied to the gaming machine processor and software. The lights may sequentially turn on and off to give the illusion of spinning or may randomly turn on and off until the selection is made in accordance with a conventional random number generator (not shown). Additionally, the lights may include a pointer light that is a different color from the other lights. By example, the lights may be blue and the pointer light may be red. The blue lights may remain on while the red light (which may be comprised of several consecutive lights) may be sequentially turned on and off to give the illusion of a spinning red light which ultimately will stop adjacent to the selected payout indicator 26. It may further be appreciated that the lights may comprise light emitting diodes (LEDs) with red-green-blue or similar coloring which came be activated according to an algorithm or pattern to cause particular visual affects that generate excitement or entertainment to a player.

Depending upon the occurrence of a winning outcome, the lights on the gaming machine 10 may begin flashing dramatically, a horn or other sounds may be emitted through the speakers 21, and a light 28 may be flashed in order to develop a sense of fanfare around a winning player and to alert casino floor personnel that a large win has occurred so that they may congratulate the winner, notify the winner of the payout, pay the winner, and/or reset gaming machine 10. Also, gaming machine 10 may be conventionally linked through a network to a host computer to provide notification to the casino of the win. Depending upon the casino management system, payouts on large wins at gaming machine 10 may be made directly to a player account managed by the host computer; in which case, the player is notified at gaming machine 10 that the player's account has been credited.

Optionally, in an alternate embodiment, the wheel game in the second primary game display 22 is a stationary wheel face 22 having multiple wheel segments 26 wherein separate prize amounts are indicated on each wheel segment 26. The pointer 24 rotates or moves in a circular motion around the stationary wheel face 22 and stops on a wheel segment 26 to indicate the winning outcome.

Additionally, in an optional embodiment, the gaming machine 10 includes a main controller (not shown) that drives any moveable portion of the wheel game (e.g. wheel 23, pointer 24), the reels 45 and other peripherals such as the video display 20. In an additional embodiment, the main controller supervises the download of video content.

Figure 2:
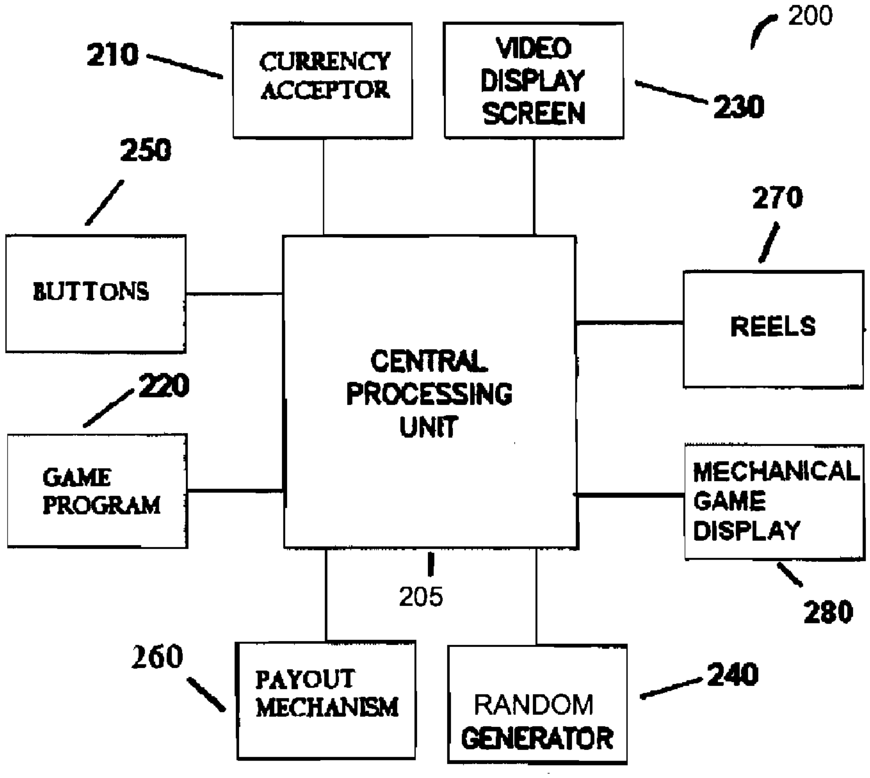
FIG. 2 is a block diagram of system components for operating an embodiment of a gaming machine comprising multiple primary games.

Referring now to FIG. 2, the block diagram 200 illustrates example system components for operating an embodiment of a gaming machine 10 comprising multiple primary games. Typically, game play is activated upon the receipt of a player wager or bet. A player may place a wager by inserting or entering a form of currency such as, but not limited to, paper currency, coins or tokens, cashless tickets or vouchers, electronic funds transfers, credits or the like into the game machine. The player then enters his wager amount. Upon receiving the player's wager, the game currency acceptor 210 signals the central processing unit ("CPU") 205.

The CPU 205 then instructs a random generator 240 to randomly select a primary game to be played. Generally, the gaming machine 10 offers at least two distinct primary games for play. In one embodiment, the random generator 240 is a random number generator. In one embodiment, the random selection of the primary game is evenly weighted. For example, in a gaming device offering two distinct primary games, both games may be played, 10 times out of 20, on average. Optionally, the random selection may not be evenly weighted. For example, one primary game may be played 17 times out of 20, and the other game 3 out of 20, on average.

Referring back to FIG. 2, once the random generator 240 selects a primary game, the CPU 205 executes a game program 220 that activates the play of a game in either the first primary game display 12 or in the second primary game display 22. The random generator 240 responds to instructions from the CPU 205 to provide a randomly selected outcome for each game. The CPU 205 then stops the selected game according to the outcome and a payout is awarded to the player as appropriate. In an optional embodiment, the outcome is evaluated, and then a payout is awarded as appropriate. In some embodiments, predetermined payout amounts for certain game outcomes are stored as part of game program 220. Such payout amounts are, in response to instructions from the CPU 205, provided to the player in the form of coins or credits by the payout mechanism 260.

In various embodiments of the gaming machine 10, the game program 220 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming machine 10 are stored in a memory device (not shown).

Referring back to FIG. 1, the first primary game is implemented on gaming machine 10 using three mechanical spinning reels 45. A pay line (not shown) passes through one indicium on each of the reels 45. The player selects the number of credits or coins wagered on the pay line using buttons 18. It will be apparent that any number of pay line patterns may be made available for play. The player may also collect the balance of his credits by pressing a CASH OUT button (not shown).

A credit meter (not shown) displays the player's current credit balance, while other meters may display the total bet size and the last amount paid by the payout mechanism. The player initiates game play by depressing a SPIN button 30 or by operating (e.g., pulling) the handle 35. Alternately, the player may simultaneously select the maximum number of coins or credits allowed and initiate the game by pressing a MAX BET button 38.

If the random generator 240 selects the first primary game, mechanical reels 45 are made to spin and subsequently stop in their predetermined stop positions (note: the stop positions were randomly predetermined before the start of the game), and a determination is then made whether the stop positions of the reels results in a winning game outcome. Winning outcomes are indicated on a pay table 70. In alternate embodiments, the pay table may be presented on a video display. On a video machine, the pay table representation of a win event is often placed on a second display or on a multi-page help screen accessible through a HELP or PAY TABLE button (not shown).

A winning combination, for example, could be three or more "BAR" symbols adjacent to one another on the pay line. For each winning combination, the player may typically receive the award identified in the pay table. The award, however, may be adjusted as necessary based on the number of credits wagered on the pay line or on the game. In other words, the amount of the prize awarded may be based on the amount wagered. Optionally, in alternate embodiments, the number of coins in determines what prize a player is eligible to win. In other embodiments, video representations of pay tables factor in the amount of the player's wager and no additional award adjustment is required.

In one embodiment, the funding of each of the primary games is based on the wagers placed for each primary game. Optionally, in another embodiment, the prize may be funded based on "coin-out", as disclosed in U.S. application Ser. No. 11/212,533, entitled "COIN-OUT GAMING REWARD SYSTEM," filed on Aug. 25, 2005, which is hereby incorporated by reference. Alternatively, the primary games may be funded based on non-gaming revenues (e.g., promotional dollars).

In various embodiments, winning combinations may be evaluated across adjacent reels from left-to-right, from right-to-left or both. Additional winning combinations may be awarded when certain indicia do not necessarily accumulate adjacently on the pay line, but rather, appear anywhere on the reels (i.e., "scatter pays"). In addition, "wild" symbols may contribute to winning combinations.

If the random generator 240 selects the second primary game, reels 45 do not spin. Instead, the pointer 24 on the second primary game display 22 begins to rotate. The pointer 24 may be configured to rotate in a clockwise, counter-clockwise or random fashion before being brought to a stop adjacent to a win amount. For example, referring to FIG. 1, the pointer 24 is stopped at 150 credits. Additionally, the pointer 24 may be brought to an abrupt stop or may gradually slow down before stopping in order to create a sense of anticipation for the player.

Optionally, in another embodiment, lighting effects are utilized to focus the player's attention. More particularly, backlighting in combination with sound effects direct the player's focus to the selected game on the machine. For example, in one embodiment a gaming machine 10 includes lighting in and around one or more of the primary games. Additionally, lighting and/or sound may also be utilized in the video display 20. More particularly, after a player enters his wager amount, the process for selecting a primary game is triggered. If the reel game is selected, lighting in the second primary game display 22 is turned off or significantly decreased. Additionally, lighting and video effects can be utilized in the video display 20 to draw the player's attention downward towards the reel game in the first primary game display 12. Additionally, sound effects can be added to enhance the effect and increase excitement. Optionally, if the wheel game is instead selected, the lighting in the first primary game display 12 is turned off or significantly decreased. Pulsating lights can be utilized to direct the player's attention in an upward direction toward the wheel game presented in the second primary game display 22. Additionally, the video display 20 may be utilized to direct the player's attention upward toward the wheel game. Sound effects, such as a pulsating beat or other sounds can be used to focus the player's attention upward and increase the excitement of the game.

Figure 3:
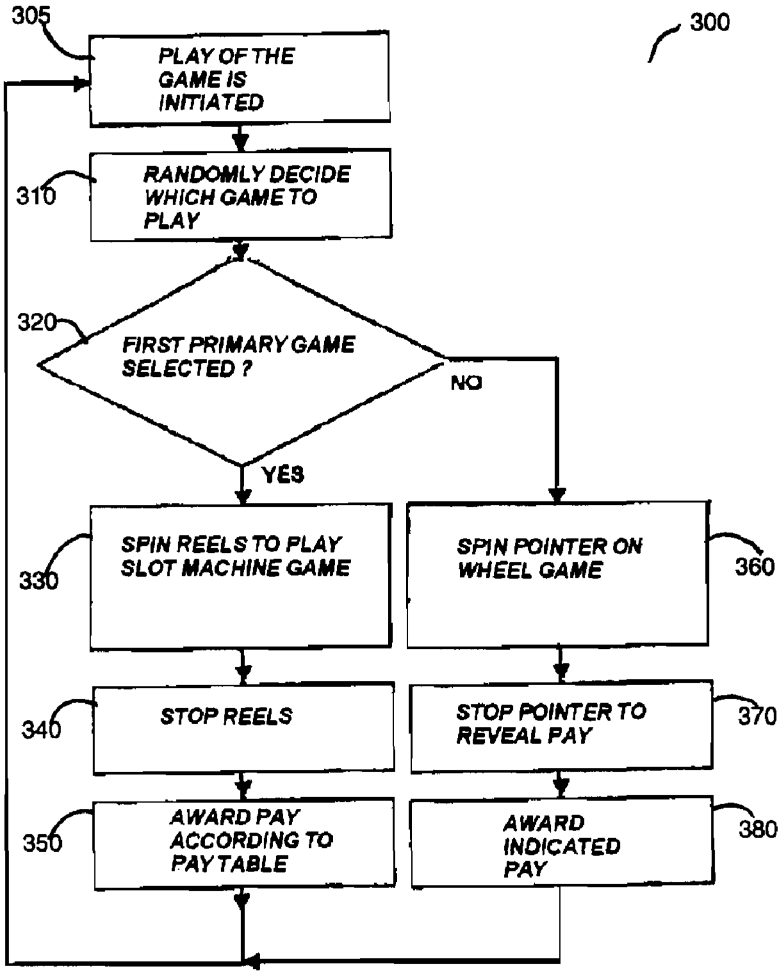
FIG. 3 is a functional block diagram illustrating a method for providing multiple randomly selectable primary games in a gaming device.

FIG. 3 is a functional block diagram 300 illustrating a method for dynamically determining a mechanical primary game display presentation. The order of actions as shown in FIG. 3 and described below is only illustrative, and should not be considered limiting. First, at step 305, the game is initiated on the gaming machine 10 of FIG. 1. For example, a player initiates game play by inserting currency of some form, selecting the denomination and quantity of a wager (which may include selecting a number of lines to play and selecting a number of credits to bet per line), and activating a start button or mechanism. Once game play is activated, a primary game is then randomly selected in step 310 to be presented to the player. In one embodiment, a random generator is used to make the random selection. Optionally, other mechanisms may be used to carry out the random selection process.

In one example embodiment, the gaming device includes two primary games. However, the gaming device may include any number of primary games and is not limited to two games. In this example, the first primary game is a slot machine game and the second primary game is a wheel game. Referring back to FIG. 3, if at step 320, the first primary game is NOT selected, the second primary game (e.g. the wheel game) is activated in step 360 and the pointer 24 rotates or moves in a circular motion around the wheel 23. In step 370, the pointer 24 stops to reveal a payout and, in step 380, an award is indicated, and thereafter paid out as appropriate.

Referring back to step 320, if the first primary game IS selected, then the process proceeds to step 330 and the reels 45 on the slot machine primary game spin. Next, in step 340, the reels 45 stop and in step 350 a payout is awarded according to the pay table.

Figure 4:
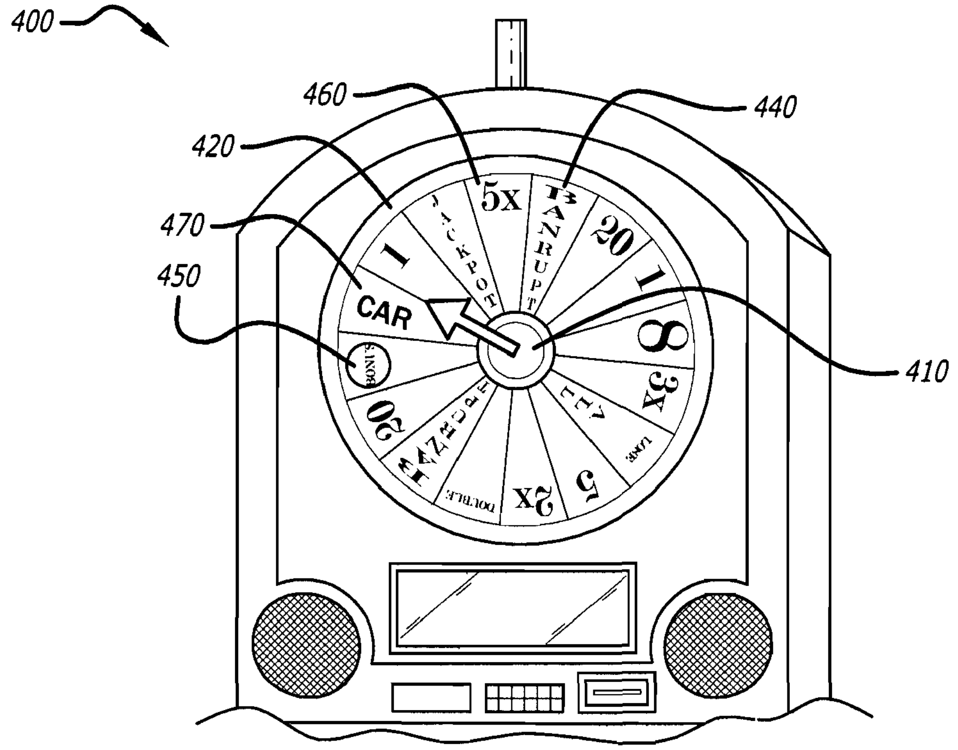
FIG. 4 illustrates an embodiment of a mechanical wheel primary game display having various types of indicia.

In one embodiment, the second primary game is a wheel game and the indicia displayed on the wheel are numerals representing amounts in credits, coins or some other representation of value. However, other kinds of indicia may also be displayed on the wheel. Referring now to FIG. 4, an alternative wheel 400 is illustrated. The indicia on the wheel face 420 of primary game display 400 may include any type or combination of indicia such as multipliers 460 (e.g., 2×, 5×, 10×), symbols 450 (slot machine indicia such as fruit, card faces or the like) or words 440 (JACKPOT, DOUBLE, RESPIN) or representations of non-monetary prizes (CAR, BOAT, FOOD). The indicia may be used individually or in combination to convey game results to the player. For example, in one embodiment, rotating pointer 410 spins two times, indicating first a "20", then a "RESPIN." The display of a RESPIN result causes rotating pointer 410 to move a third time, for example, to a "10×" indication. The entire sequence, therefore, would indicate a game outcome of 200 (20 times 10), coins or credits. In some embodiments, the award indicated by the primary game display may be adjusted as necessary based on the number of credits wagered on the game. It should be appreciated that the above examples of mapping a possible game outcome to a display presentation are intended to be illustrative and should not be construed as limiting in any way.

Other methods may be used to provide an entertaining presentation of a numeric win amount. For example, one entertaining presentation mechanism is disclosed in U.S. provisional Application Ser. No. 60/727,400 entitled "EXPANDED PRIMARY PAYOUT INDICATOR FOR A GAMING DEVICE," filed on Oct. 17, 2005, which is hereby incorporated by reference. In one embodiment, once the game results have been evaluated and a total win amount is known, the gaming machine may employ an algorithm that dynamically calculates one or more display pointer presentations that will, when presented, accumulate a total equal to the win amount. For example, if a primary game display has potential pay values of 1, 2, 4, 8, 10, 20, 100 and 2×, it would be possible for such an algorithm to show a pay of 100 using a single 100 presentation, a sequence of 20-8-2-10-2×-20, or any other combination totaling 100.

Figure 5:
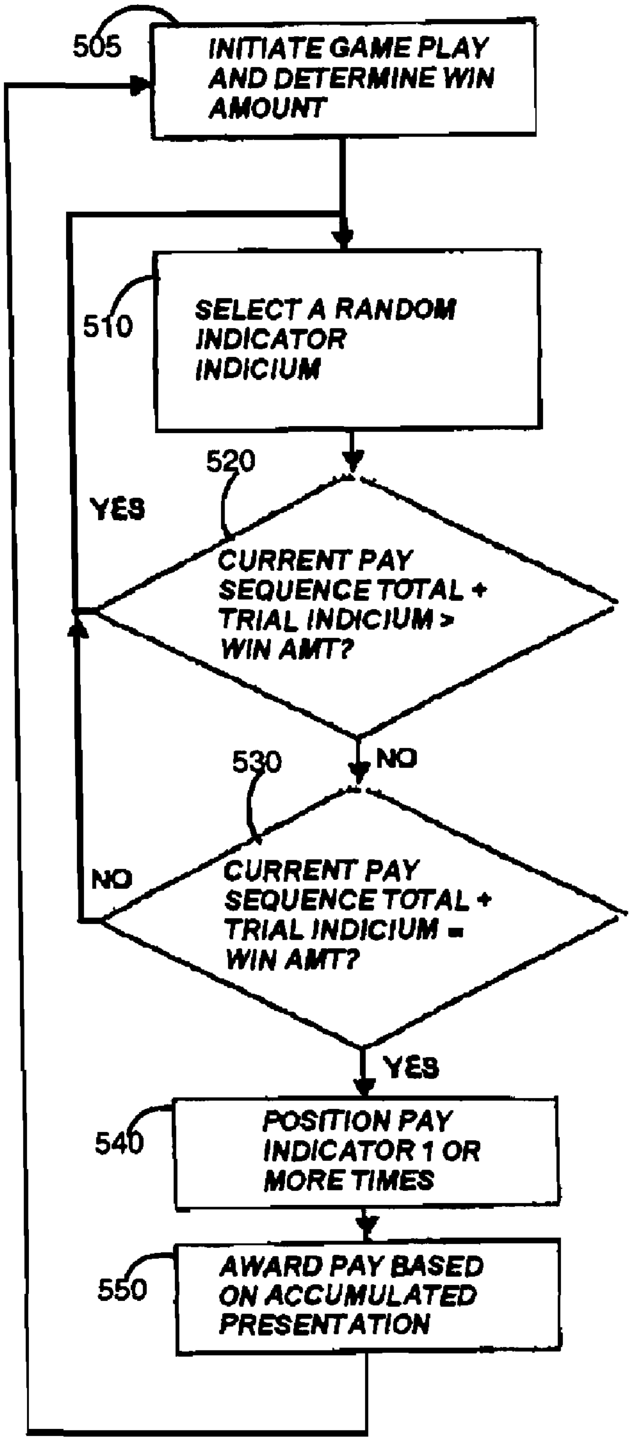
FIG. 5 is a functional block diagram illustrating a method for dynamically determining a mechanical primary game display presentation.

FIG. 5 is a flow diagram generally depicting the acts associated with carrying out an example of a mechanical primary game display (such as a pointer) sequence. The order of actions as shown in FIG. 5 and described below is merely provided for illustrative purposes, and is not intended to be limiting. The example algorithm uses a random trial-and-error to produce a valid presentation sequence by repeatedly selecting a presentation value, seeing if applying this value to the current presented total would exceed the actual win amount and, if not, including this presentation value in the display sequence until the actual win amount has been exactly reached.

First at block 505, the actual win amount is determined. For example, the player initiates play of the game by inserting currency of some form, selecting the quantity of a wager and presses a start button or switch. The game may also be randomly selected for play as described above.

Next, at block 510, a random pay amount for the game outcome is selected using a random generator. Using the pay determined in block 510 as a target, the random generator is further used to select one of the available pay indicia on the primary game display indicator at block 520. If a relatively short display sequence is desired, a weighted table may be used to favor certain higher amounts, 100, for example, on the display.

A trial addition of the currently selected pay indicium is applied to the current presentation sequence total, i.e., the amount the current presentation sequence would display if presented immediately, at decision block 520 to see if the resulting new amount would exceed the actual win amount. For example, if a total pay presentation of 100 is required, the current presentation sequence total is 80 and the currently selected indicium is 200, the currently selected indicium would not be added to the display presentation sequence and processing would return to block 510 for selection of a new trial indicium. It should be noted that, as long as there is at least one indicium on the display face, a valid sequence will eventually be selected.

If the trial application of the selected pay indicium does not exceed the actual win amount, the indicium is added to the display sequence and processing continues to block 530, where it is determined whether the current sequence will display the actual win amount exactly. If so, the sequence is fully constructed and processing proceeds to block 540 otherwise, processing returns to block 510 for selection of another indicium.

At block 540, the display pointer is sequenced through one or more positions that progressively reveal the win amount to the player. Processing continues at block 550 where the accumulated pay amount that has been shown by the display is awarded to the player. Normal play resumes at block 505.

Figure 7:
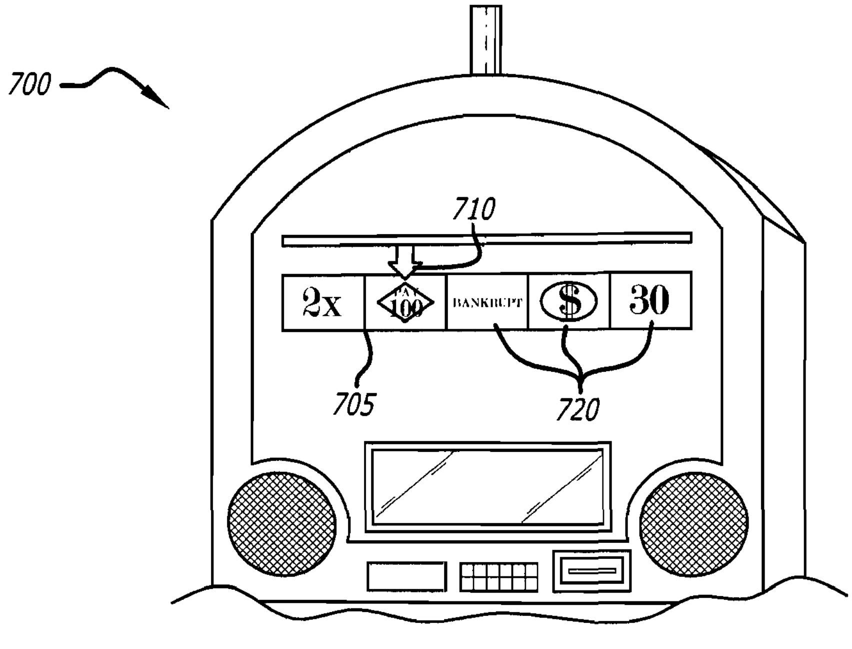
FIG. 7 illustrates an embodiment of a gaming machine having a primary game display using a linear moving pointer.
Figure 6:
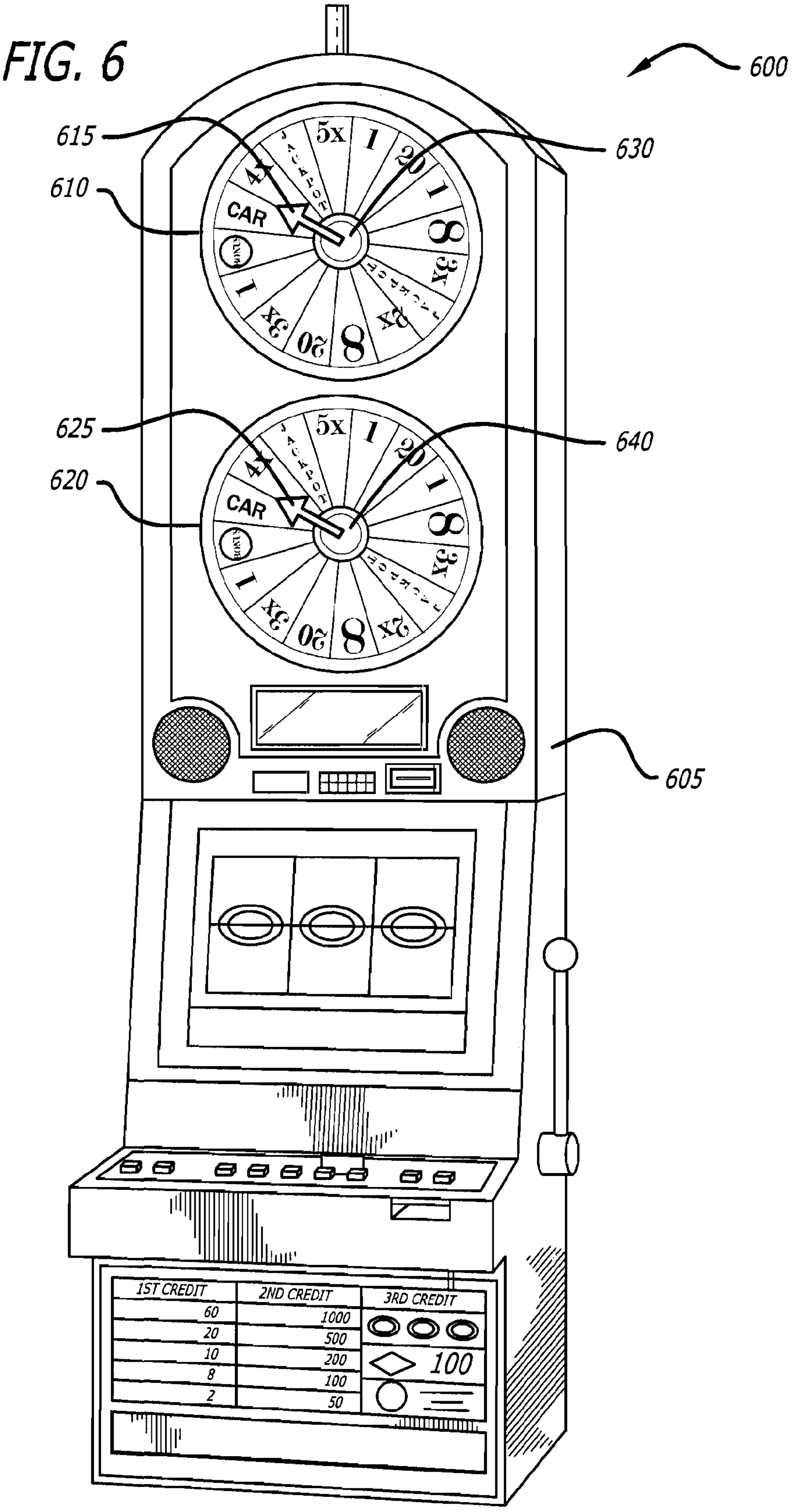
FIG. 6 illustrates an embodiment of a gaming machine having a mechanical primary game display with two wheel and pointer mechanisms.

In an optional embodiment, the gaming machine 10 offers at least three distinct primary games for play. Referring to FIG. 6, gaming machine 600 has two mechanical display indicators 610 and 620, which may be used in combination to represent a win value for a single primary game. For example, two pointers 615 and 625 on wheel faces 630 and 640 both indicate pays of 150 for a total pay of 300. A single one of these devices could be used to indicate multiple values sequentially (multiple spins) or simultaneously (using multiple pointers on one or more wheel faces). Displays could be viewed through multiple windows in front of one or more disks or the entire disk(s) may be visible. In other embodiments, the primary game display may take any shape or form such as, by way of example and without limitation, additional reels, a rotating wheel or disk, or a clock-like face. The wheel may take the form of a "light wheel" or "light bar" on which one or more illuminated lights indicate the position of a plurality of simulated pointers. In still further embodiments, the mechanical primary display may comprise a linear representation of a stationary pointer beside or beneath which pay indicia move or, as illustrated in FIG. 7, primary display indicator 700 may comprise a plurality of indicia 720 and one or more movable pointers 710 arranged to stop adjacent to and indicate any of the indicia. Alternately, video representations of these or similar primary game displays may be used.

Figure 8:
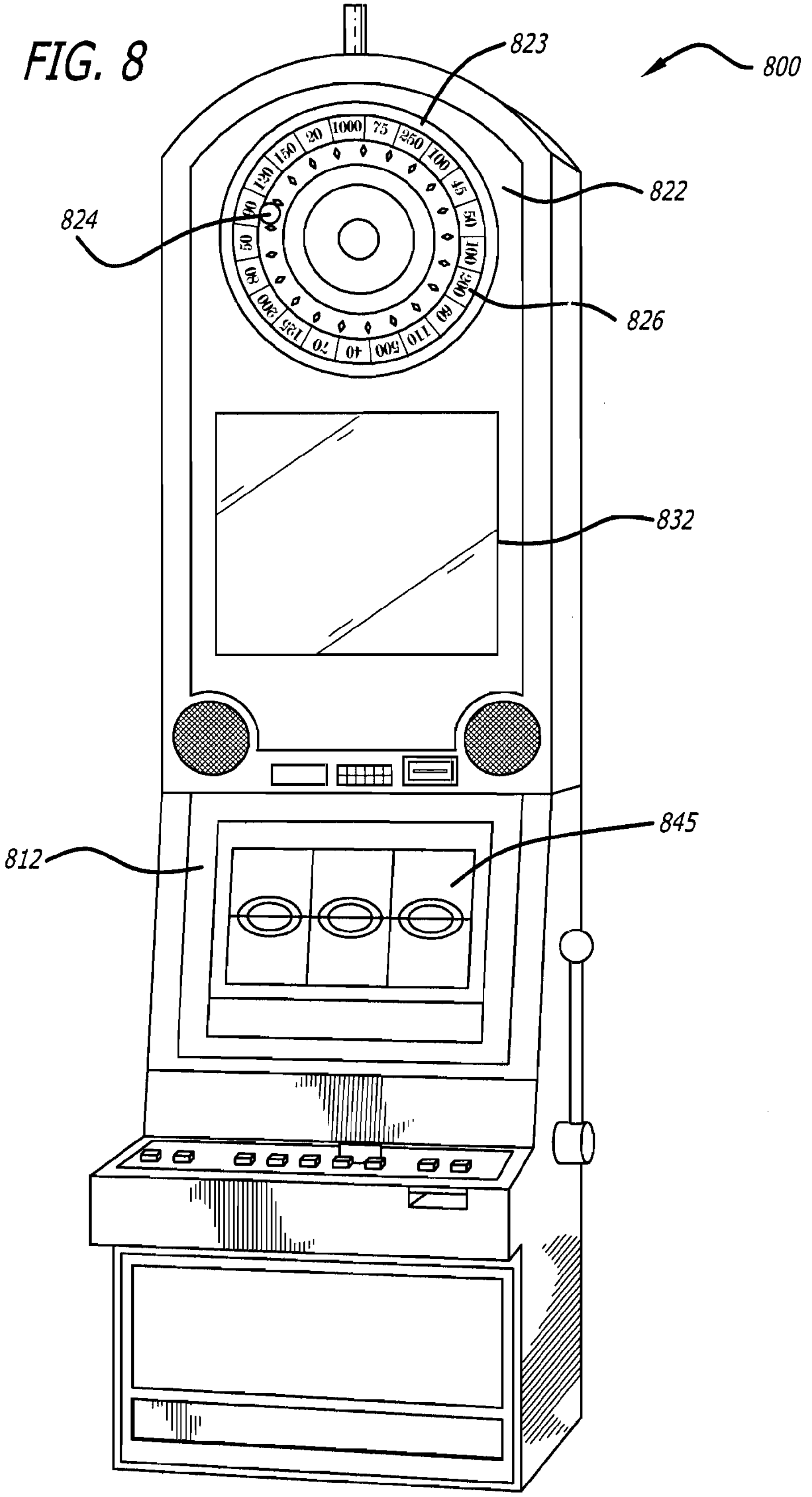
FIG. 8 illustrates an embodiment of a gaming machine comprising two or more primary games.

Optionally, in an alternate embodiment, the gaming machine offers at least three different types of primary games for play. Referring to FIG. 8, a gaming machine 800 offers a reel game, a wheel game and a video game. A reel game is presented in a first primary game display 812 and a roulette-style wheel game is presented in a second primary game display 822. Additionally, a video-type game of chance is presented in a third primary game display 832. The video game may include one or more games of chance such as, but not limited to, video slots, video poker, video blackjack, video keno, video representation of a wheel game or any other video representation of a game of chance. In alternate embodiments, the third primary game display 832 may present games of skill or game of chance involving some player skill.

Those skilled in the art will readily recognize that while two primary games have been illustrated that are randomly or systematically activated on gaming machine 10, gaming machine 10 may have three or more primary games that may be implemented to play selectively as discussed above through a random or systematic selection. Additionally, it may further be appreciated that each of the games could be operated on a remote host computer, such that gaming machine 10 operates the respective gaming and video displays in conjunction with the host computer game play; and, a player initiates play through the player interface with the host computer over a network. It may further be appreciated that while a wheel game has been illustrated and described, wheel 23 could be replaced by a square, circle, polygon, or other area representation in which the various payout indicators 26 of different shapes and sizes may be situated and identified or selected with a pointer or a light, that is randomly determined according to the software and/or hardware of gaming machine 10. As an example, a square game may include a large square surrounding a set of squares with payout values and a pointer light that sequentially or randomly lights each of the squares until a payout square is selected. Additionally, it may further be appreciated that the pointer 24 may be represented in a variety of shapes, such as but not limited to a circle, square, triangle, arrow, ball or any type of symbol. Optionally, in an alternate embodiment, a wheel game may include multiple pointers, for example in the shape of balls, or any other shape.

In another embodiment, a player can place bets in anticipation of the type of primary game that will be selected. For example, in a gaming machine offering two distinct primary games, the player may place two distinct wagers. More particular, the player may wager 3 credits for a first primary game and may wager 2 credits for the second primary game. Play of the game is activated by pressing start (or via some other activation means). Once the gaming machine receives the multiple wagers, the gaming machine then randomly selects a game to present to the player. If the gaming machine presents the first primary game, then the player's 3-credit wager is applied. Similarly, if the second primary game is instead presented to the player, then the player's 2-credit wager is applied. As those skilled in the art will appreciate, any combination of wagers may be placed in this type of game scenario. Optionally, in an alternate embodiment, the game sacrifices one of the multiple wagers placed. For example, a player makes a 3-credit bet on the first primary game and a 2-credit bet on the second primary game. After the player presses start, the first primary game is randomly selected and is displayed on the first primary game display. The player's 3-credit bet is applied to the first primary game and the player's 2-credit bet (placed on the un-played second primary game) is sacrificed.

Optionally, in one embodiment, in a gaming machine 10 having at least two primary games, each game has its own math model. For example, in one embodiment a gaming machine has a first primary game and a separate, second primary game. More particularly, the first primary game has a math model separate from the second primary game. As a result, the player's entire wager is devoted to the primary game being played. Alternatively, in an optional embodiment, only a portion of the player's wager is devoted to the primary game being played. In an optional embodiment, the wager received is applied towards all primary games. For example, if the gaming machine offers two primary games, then under this exemplary scenario a received wager is applied to both primary games.

In another embodiment, the gaming machine requires a minimum wager to trigger game play. For example, in one embodiment a minimum wager of thirty credits is required. Those skilled in the art will appreciate that any minimum wager value may be implemented to trigger game play. Referring back to the thirty-credit minimum wager example, in one embodiment, the funds are applied to a general pool. If the gaming machine offers a first primary game and a second primary game, the minimum required credits for play may qualify the player for either game. If the first primary game is a reel game and the second primary game is a wheel game, then on a thirty-credit wager, if the reel game is selected, the player is allowed twenty lines of play in the reel game and ten credits are applied to the wheel game. Those skilled in the art will appreciate that the gaming machine may include any number of additional primary games.

Alternatively, in an optional embodiment, a minimum wager amount is required for each primary game. The required minimum wager may be the same for each primary game. Optionally, in other embodiments, the required minimum wager may vary for different games. For example, in one embodiment the gaming machine provides two different primary games: a wheel based primary game and a reel based primary game. In one embodiment, a minimum bet of 10 credits is required to play the reel game and a minimum bet of 30 credits is required to be eligible for the wheel game. Those skilled in the art will appreciate that the required minimum bet may be any value. In another example, a minimum bet of 25 credits is required to play the reel game and minimum bet of 35 credits is required to be eligible to play the wheel game. Under this scenario, if the player places a bet of 30 credits, he would only be eligible to play the reel game.

Additionally, in another embodiment, any game may be selected regardless of the amount the player wagered. However, the prize amount will change based on the player's wagered amount. In an optional embodiment, multiple spins are provided and occur based on the player's wager.

Optionally, in an alternate embodiment, the gaming machine limits the player's betting options. More particularly, in an optional embodiment, instead of specifying the number of lines and the number of coins per line, the player is only allowed to enter a total wager amount, which is then distributed on his behalf by the game logic. This provides a simpler interface for the player and controls the play experience.

In another embodiment, wherein one of the primary games is a wheel game, segments of the wheel will only pay if purchased. In other words, the machine may "land" on a winning outcome, but if the outcome was not purchased by the player, no payout is awarded. For example, in one embodiment, the wheel is divided into red, white and blue segments (not shown). A low bet range would purchase the red segments. If the game stops on a white or blue segment, the player does not receive a payout award. Rather, the player only receives a payout if the game stops on a red segment. A medium-sized bet might buy both the red and the white segments. Larger bets to the max bet would buy the red, white and blue segments. In one embodiment, the lower, more frequent pays would occur with the red segments. Optionally, one "higher paying award" may be contained on a red segment. However, the higher pays would generally be contained in the white and blue segments. In another embodiment, after the player places his wager, the eligible segments are indicated by the use of lights. More particularly, if a player places a lower bet on the red segments, then the eligible red segments would "light-up" and the non-eligible white and blue segments would be darkened, or alternatively, not as brightly lit.

Additionally, in an optional embodiment, a gaming machine 10 may be used in a casino gaming system. In one embodiment, the gaming machine is operatively connected to a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on a gaming machine 10. These input components (not shown) include, but are not limited to, a slot for receiving a player tracking card, a keypad or equivalent, an electronic button receptor, a touch screen, or the like. The player tracking system may also include a database of all qualified players (i.e., those players who have enrolled in a player rating or point accruing program). Generally, the database for the player tracking system is separate from the gaming machine 10. In one embodiment, the insertion of a player tracking card, triggers the random selection process of one of the multiple primary games offered on the gaming machine 10.

Figure 9:
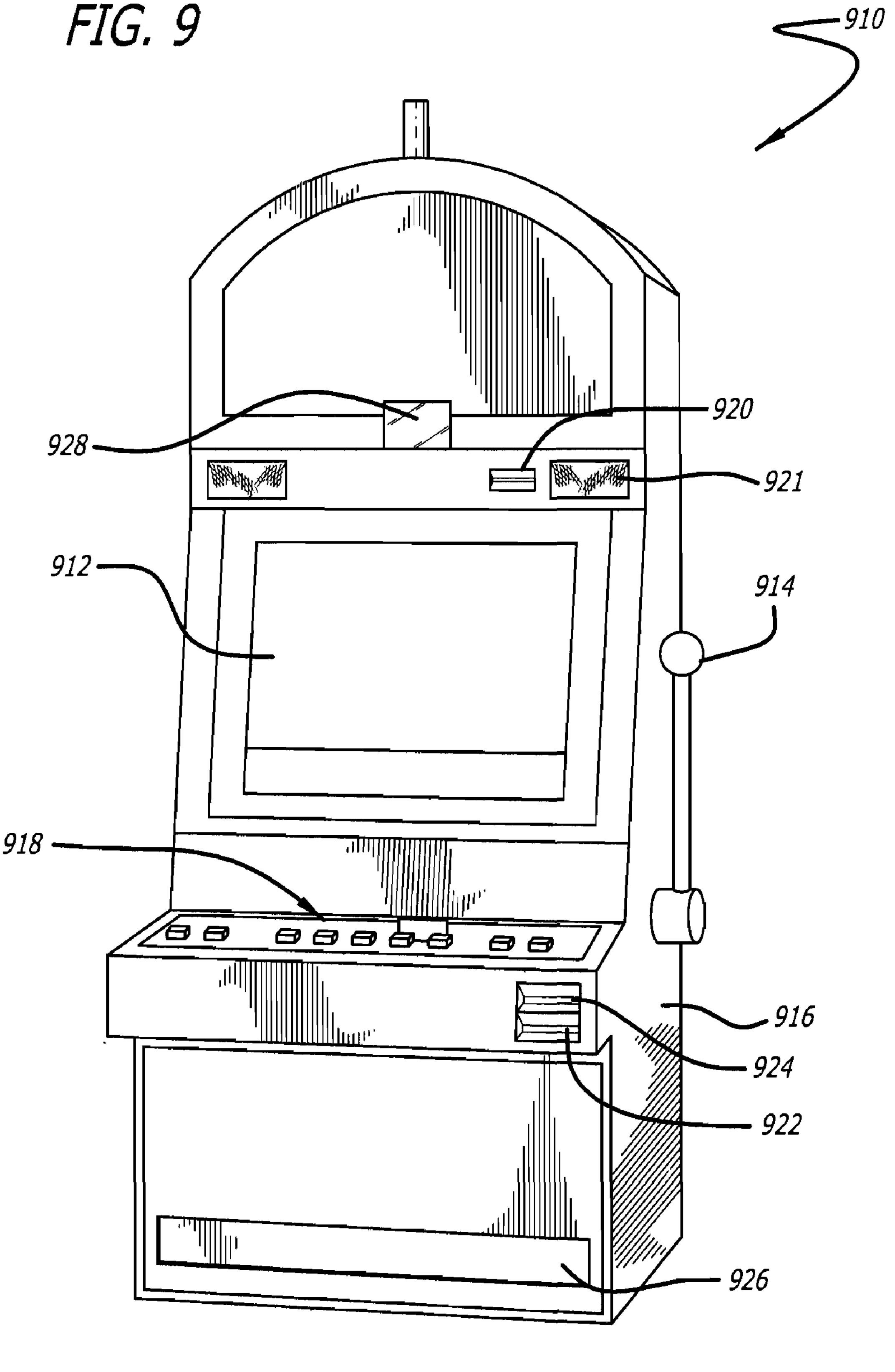
FIG. 9 illustrates an embodiment of a gaming machine comprising a single game display.

In an optional embodiment, the gaming machine comprises multiple primary games and a single game display. In FIG. 9, the gaming machine 910 includes two or more distinct primary games, either of which may be presented on the game display 912. In one embodiment, the game display 912 is a video display such as, but not limited to CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions.

Additionally, more than one game may be shown or played simultaneously, substantially simultaneously or sequentially, in the game display 912. Optionally, the gaming machine includes two or more distinct primary games, and any of the games may be presented on the single game display 912. In an alternate embodiment, the gaming machine (not shown) comprises multiple displays and multiple primary games.

In one exemplary embodiment, the game display 912 presents one game at a time. In this example, the gaming machine 910 includes at least a first primary game and a second primary game. Those skilled in the art will appreciate that the gaming machine may include any number of additional primary games. Once game play is activated on the gaming machine 910, a primary game is selected for presentation to the player on the game display 912. In one embodiment, a selection means randomly selects the primary game. Alternatively, in another embodiment, a random number generator selects the primary game. Once the primary game is selected, the game is displayed on the game display 912. For example, if a reel game is the selected primary game, then spinning reels are presented on the game display 912. Alternatively, if a wheel game is selected, a wheel is instead presented on the display 912. Optionally, other types of games such as, but not limited to video poker, video blackjack, video keno, roulette, Class II bingo, and craps may also be shown on the display 912.

In an alternative embodiment, the game display 912 presents two or more games simultaneously. For example, once the game machine 910 is activated, a wheel game and a reel game are both simultaneously presented in different portions of the game display 912.

In another embodiment, the primary game state may be saved. In one example, the gaming machine 10 is operatively connected to a back end server via a network connection (not shown), and the game state information may be saved on the back end server. Alternatively, the game state information may be saved on a player identification card or an alternative memory means connected to the gaming machine 10. In another system-based embodiment, the accumulated symbols or units earned by a player during a playing session may be preserved at the termination of play such that the "game state" of the player is maintained from one playing session to another. By way of example and not of limitation, the player may later resume play of gaming machine 10 at the preserved game state by inserting an identifying player card, entering an identification sequence on the player interface, or inserting a voucher or other medium that identifies the particular saved game state. One such means is disclosed in U.S. Pat. No. 6,923,721, entitled "Apparatus and Method for Maintaining Game State," which is hereby incorporated by reference, but any means may be used provided the player is able to resume play without loss of accumulated units from one playing session to the next.

Optionally, in an alternative embodiment, one or more of the primary games may trigger a bonus or secondary game. The bonus game is separate and distinct from the multiple primary games offered on the gaming machine 10. Additionally, the bonus game state information may be saved and utilized at a later time as disclosed in pending application Ser. No. 10/171,267, entitled "System and Method for Enhancing Game Play with Non-Credit Game Awards," filed Jun. 11, 2002.

In an optional embodiment, at least one of the primary games is a horse race type game. In one example, the game simulates a horse race and the player bets on a horse to win. Optionally, in alternate embodiments, the player may additionally bet on a horse to place and a horse to show. In one embodiment, the simulated game is displayed on a video screen. Once the player places his bet the game is activated and an outcome is displayed on the video screen. Optionally, in alternate embodiment, the player must pull a handle or push a button to trigger activation of the game. Additionally, in optional embodiments, the horse race game includes multiplier effects, wherein a "winning horse" may include some type of multiplier to increase the payout award.

In another embodiment, the gaming machine provides one or more primary games that utilize one or more devices during game play. For example, referring to FIG. 1, the gaming machine 10 comprises multiple devices such as the reels 45, the wheel 23 and the display 20. In one example embodiment, a first primary game may use the wheel 23 and one or more of the reels 45 during play of the first primary game. Additionally, a second primary game, different from the first primary game, may use only the wheel 23 or the reels 45 during game play. Optionally, a primary game may use, in combination, the wheel 23 and the display 20 during game play. Similarly, a different primary game may use, in combination, one or more of the reels 45 and the display 20 during game play. Those skilled in the art will appreciate that any combination of devices may be used during game play.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming system providing multiple, distinct primary games for game play, the gaming system comprising:

a memory device storing sets of instructions, each set for executing one two or more primary games;

a central processing unit operatively coupled with the memory device configured to execute only one of the two or more primary games and prevent execution of another primary game in response to receiving a wager, wherein only a single primary game is executed per wager, and wherein the central processing unit is operatively coupled to a player input mechanism;

a primary game selector operatively coupled with the central processing unit and configured to select only one of the primary games from the memory device, for execution by the central processing unit, in response to receiving the wager, wherein the primary game selector is activated in response to player activation and uses a random number generator that is weighted to statistically select a first primary game from the two or more primary games more often than a second primary game from the two or more primary games, and wherein the gaming system presents no options in which players may specifically select the first primary game or specifically select the second primary game; and a game display for presenting the selected primary game.

2. The gaming system of claim 1, wherein the game display is a video game display.

3. The gaming system of claim 1, wherein the gaming system further comprises an ergonomic gaming cabinet.

4. The gaming system of claim 1, further comprising:

the two or more primary games including a reel based primary game having multiple reels;

the two or more primary games including a wheel based primary game having a wheel and a pointer, wherein at least one of the wheel and the pointer are a movable portion; and a main controller housed within the gaming system, wherein the main controller drives the moveable portion of the wheel based primary game and the multiple reels of the reel based primary game.

5. The gaming system of claim 4, further comprising a video display configured to display video content, wherein the main controller supervises download of video content.

6. The gaming system of claim 1, further comprising lighting effects to illuminate the selected primary game.

7. The gaming system of claim 1, further comprising one or more additional game displays, wherein each game display presents a different primary game.

8. The gaming system of claim 1, further comprising lighting effects to illuminate the selected primary game in the game display.

9. The gaming system of claim 1, wherein at least one of the two or more primary games is a wheel game having multiple pointers.

10. The gaming system of claim 9, wherein one or more of the pointers is ball-shaped.

11. The gaming system of claim 9, wherein one or more of the pointers is arrow-shaped.

12. The gaming system of claim 1, wherein one or more primary games requires a particular minimum wager to be placed before the primary game is eligible for selection by the primary game selector.

13. The gaming system of claim 12, wherein the particular required minimum wager is not equal for each of the two or more primary games.

14. The gaming system of claim 1, wherein at least one of the two or more primary games is a wheel based primary game having a pointer and a wheel divided into a plurality of segments, and wherein one or more of the segments are available to the player for purchase before game play, such that the player is awarded a payout if, at a game outcome, the pointer indicates a purchased segment.

15. The gaming system of claim 1, wherein the gaming system enables saving a game state of the selected primary game.

16. The gaming system of claim 1, wherein at least one of the two or more primary games is a horse race type game.

17. The gaming machine of claim 1, wherein the random number generator is weighted to statistically select the second primary game only once in every thirty plays of the gaming machine.

18. A method for playing a game on a gaming system having at least two distinct primary games and a central processing unit, the method comprising:

providing the gaming system that includes the at least two distinct primary games, each primary game including a processor, a memory device, and a game display coupled to the central processing unit;

the central processing unit receiving a player wager from an input mechanism operatively coupled to the gaming system;

the central processing unit enabling a primary game selector to select only one primary game from the at least two distinct primary games for game play, wherein selection of the primary game is not determined by the player;

the central processing unit activating effects to draw attention to a location of the selected primary game;

the central processing unit enabling execution of only one of the at least two distinct primary games and preventing execution of another distinct primary game in response to the received wager, wherein the primary game selector is activated in response to player activation and uses a random number generator that is weighted to statistically select a first primary game from the at least two distinct primary games more often than a second primary game from the at least two distinct primary games, and wherein the gaming system presents no options in which players may specifically select the first primary game or specifically select the second primary game;

the processor of the selected primary game presenting a game outcome to the player; and the central processing unit awarding a payout for the game outcome when the game outcome is a winning game outcome.

19. The method of claim 18, further comprising activating sound effects in combination with lighting effects.

20. The method of claim 18, further comprising the central processing unit preserving a game state of the selected primary game.

21. The method of claim 18, wherein at least one of the primary games of the at least two distinct primary games is a wheel based primary game having a pointer and a wheel divided into a plurality of segments, and wherein a processor of the wheel based primary game is configured to:

require the player to purchase one or more segments of the wheel before playing the wheel based primary game;

play the wheel based primary game and present a game outcome; and award a payout, if the pointer indicates a purchased segment.

* * * * *